(12) United States Patent
Cuzzo et al.

(10) Patent No.: US 6,463,953 B1
(45) Date of Patent: Oct. 15, 2002

(54) FIRE HYDRANT PROTECTION DEVICE

(76) Inventors: Joseph Cuzzo, 19 Barlik St., Carteret, NJ (US) 07008; William Spilfogel, 15602 Cypress Dr., Wellington, FL (US) 33414; Jeffrey A. Spilfogel, 15763 Cypress Dr., Wellington, FL (US) 33414; Donald C. Johnson, 15911 Lisbon Ct., Wellington, FL (US) 33414

( * ) Notice: Subject to any disclaimer, the term of this patent is extended or adjusted under 35 U.S.C. 154(b) by 0 days.

(21) Appl. No.: 10/006,189

(22) Filed: Dec. 7, 2001

(51) Int. Cl.[7] ............................ F16K 35/10; E03B 9/06
(52) U.S. Cl. .................... 137/296; 137/382; 220/724; 220/725
(58) Field of Search ........................ 137/296, 382; 220/724, 725, 726, 727, 730

(56) References Cited

U.S. PATENT DOCUMENTS

| | | | | | |
|---|---|---|---|---|---|
| 468,782 | A | * | 2/1892 | Brentano | 137/296 |
| 565,013 | A | * | 8/1896 | Moodie | 137/296 |
| 926,027 | A | * | 6/1909 | Smith | 137/296 |
| 1,105,040 | A | * | 7/1914 | Paulus | 137/296 |
| 2,699,176 | A | * | 1/1955 | Ucciardi | 137/296 |
| 2,869,576 | A | * | 1/1959 | Kennedy | 137/296 |
| 3,379,209 | A | * | 4/1968 | Spiselman | 137/296 |
| 4,736,765 | A | * | 4/1988 | Campbell | 137/296 |
| 4,825,898 | A | * | 5/1989 | Vis | 137/296 |
| 6,112,761 | A | * | 9/2000 | Scotto | 137/296 |

FOREIGN PATENT DOCUMENTS

| | | | | |
|---|---|---|---|---|
| DE | 287397 | * | 12/1914 | 137/296 |
| DE | 692547 | * | 3/1940 | 137/296 |
| DE | 734267 | * | 3/1943 | 137/296 |
| DE | 813525 | * | 7/1951 | 137/296 |
| FR | 811384 | * | 4/1937 | 137/296 |
| FR | 1066861 | * | 6/1954 | 137/296 |

* cited by examiner

*Primary Examiner*—George L. Walton
(74) *Attorney, Agent, or Firm*—Walter J. Tencza, Jr.

(57) ABSTRACT

An apparatus is disclosed comprising a first cover and an attachment device to which the first cover is connected, wherein the attachment device can be used to attach the first cover to a fire hydrant such that the first cover covers the first nozzle cap. The apparatus may also be comprised of second and third covers which are also attached to the attachment device and which can be used to cover second and third nozzle caps of the fire hydrant. The attachment device may be comprised of a first portion, the first portion substantially in the form of a ring. The attachment device may be comprised of a second portion, and the second portion can be connected to the first portion so that the first portion and the second portion provide a closed ring.

22 Claims, 5 Drawing Sheets

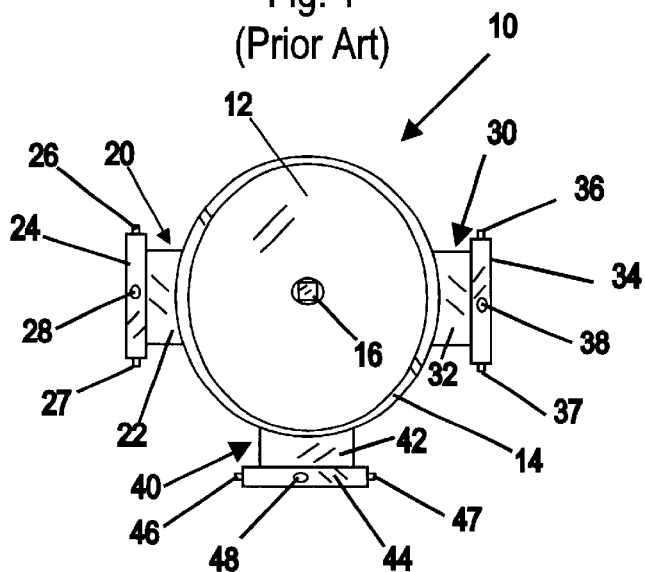
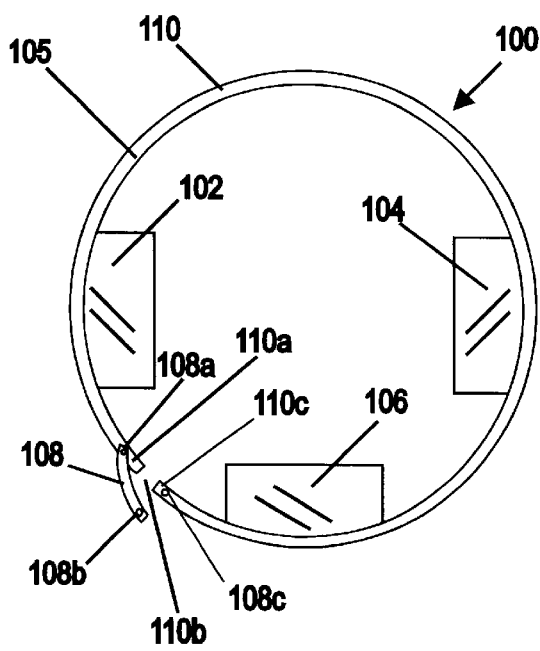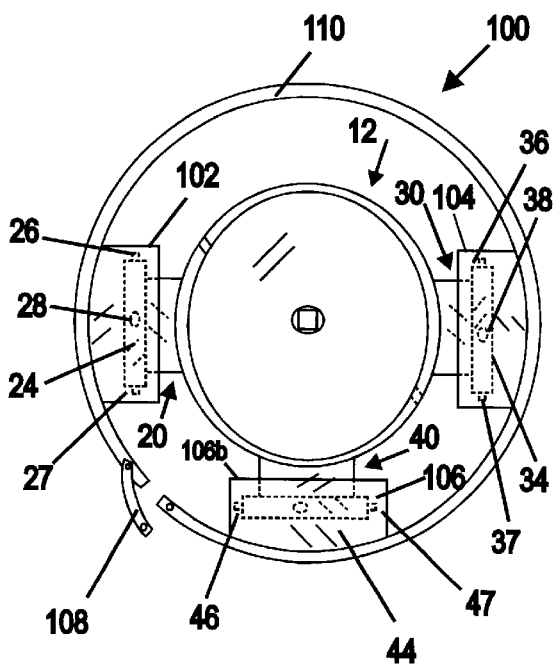

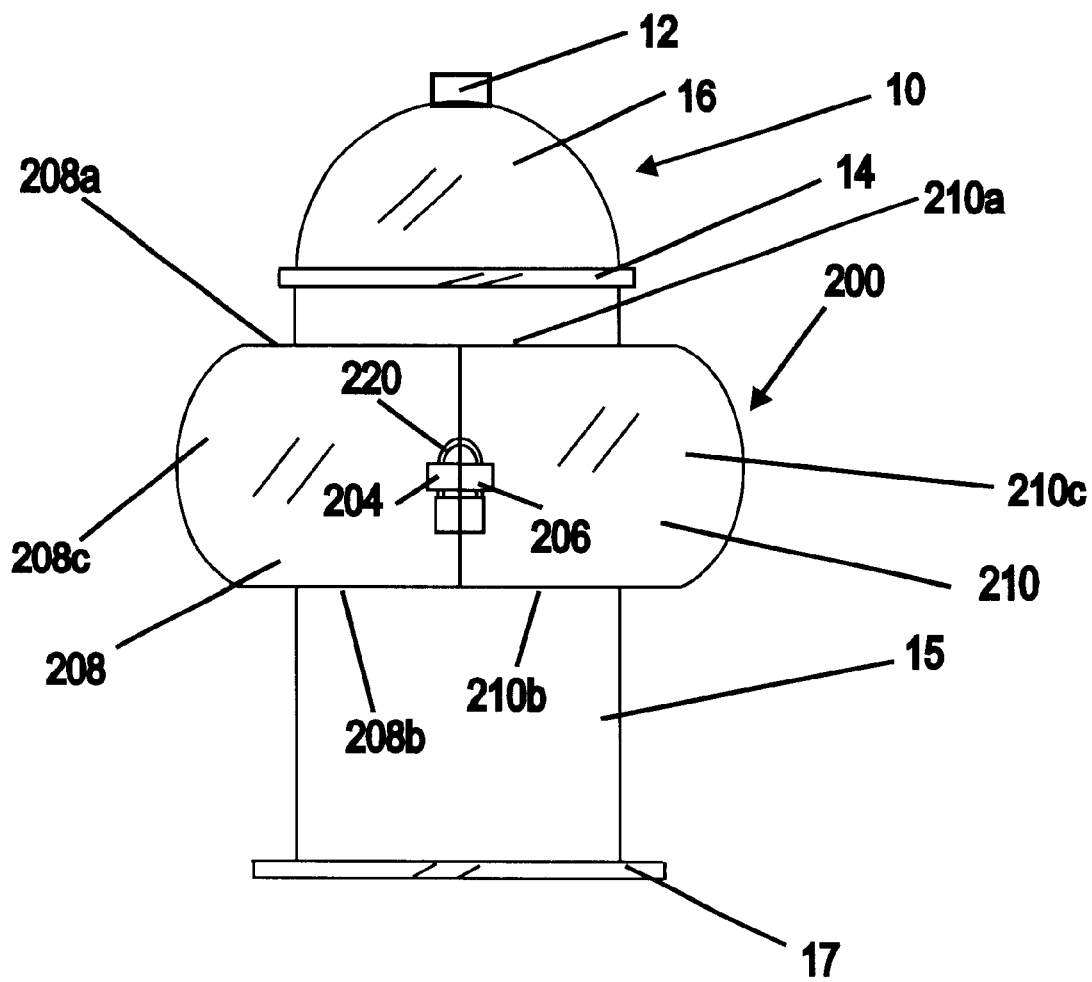

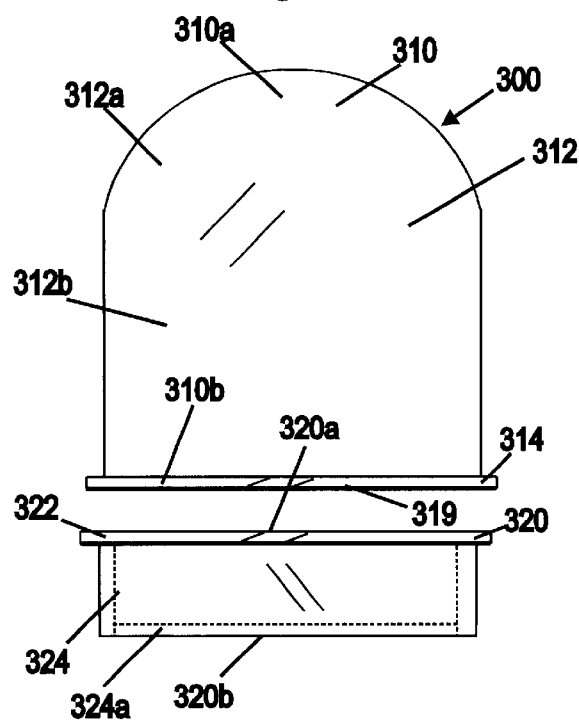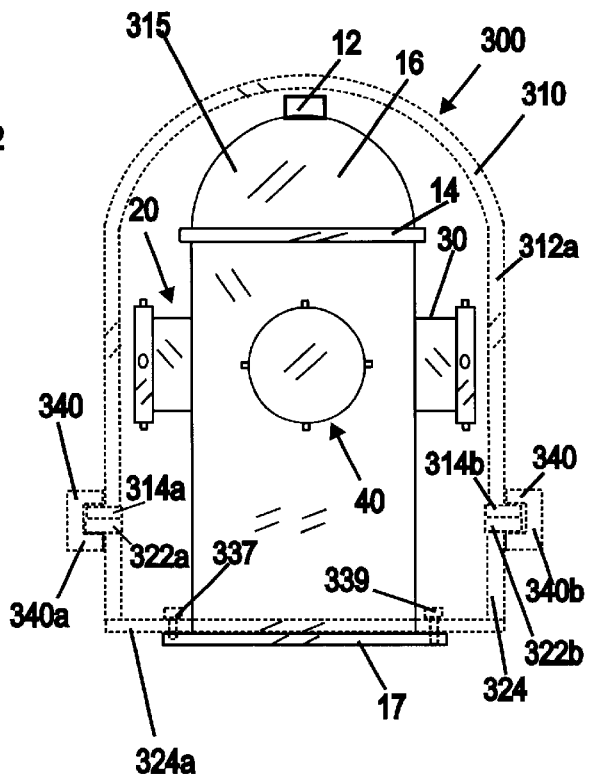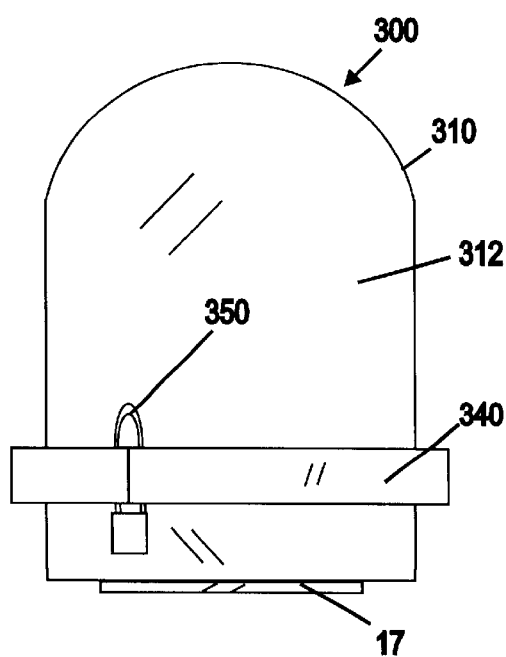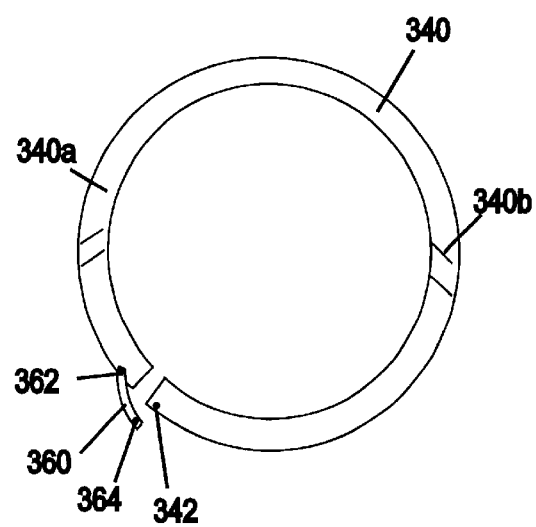

FIRE HYDRANT PROTECTION DEVICE

FIELD OF THE INVENTION

This invention relates to improved methods and apparatus concerning protecting fire hydrants from terrorism, vandalism, or interference with the water supply from those fire hydrants.

BACKGROUND OF THE INVENTION

Typically in the prior art fire hydrants have been relatively easy to tamper with. This has become a more serious issue due to the concern regarding possible terrorist contamination of municipal water supplies. Thus far, the approach to protecting municipal water systems has been to heighten security at central sites such as reservoirs, treatment plants and pumping stations. However, these measures do nothing to address the problem of drinking water contamination by terrorists attacking a city's water supply via the network of easily accessible fire hydrants.

The general public is unaware that fire hydrants are connected to the municipal drinking water system. A hydrant, capable of passing hundreds of gallons per minute, provides an easy and effective means of injecting large volumes of chemical contaminants. And, since hydrants are located in the communities they serve- downline of reservoirs, treatment plants, and pumping stations-such acts of terrorism would evade any treatment, monitoring and other protective measures currently in place.

If a municipal reservoir were to be attacked by chemicals, even in large amounts such as a tanker load, the dilution effect would quickly reduce their concentrations. If, on the other hand, the same amount of chemical was dispensed into a municipal fire hydrant, there would be a dangerous consequence. The entire load of chemicals would be quickly distributed in high concentrations throughout the city's network of water mains. The effects would be both immediate and devastating.

Unfortunately, the design of the municipal fire hydrant provides virtually no security from attack. Clearly, hydrant tampering, once simply an act of teenage vandalism now has the potential to become a serious threat to our nation's water systems, deserving of careful consideration.

SUMMARY OF THE INVENTION

The present invention proposes an effective anti-tampering device or apparatus for fire hydrants. This device, once attached to a fire hydrant, can be quickly removed by firefighters, but an unauthorized person would be prevented or substantially inhibited from opening the hydrant's nozzles, thereby denying them easy access to the water system.

The present invention in one or more embodiments provides an apparatus comprising a first cover which can cover a first nozzle cap of a fire hydrant, and an attachment device to which the first cover is connected, wherein the attachment device can be used to attach the first cover to a fire hydrant such that the first cover covers the first nozzle cap. The apparatus may also be comprised of second and third covers which are also attached to the attachment device and which can be used to cover second and third nozzle caps of the fire hydrant.

The attachment device may be comprised of a first portion, the first portion substantially in the form of a ring, The attachment device may be comprised of a second portion, and the second portion can be connected to the first portion so that the first portion and the second portion provide a closed ring. Each of the first, second and third covers may be comprised of substantially cylindrical body portions which have an opening at one end into which a nozzle cap can be inserted and a closed surface at an opposite end which substantially prevents the appropriate nozzle cap from being removed.

The present invention also includes a method comprising the steps of attaching one or more covers to a fire hydrant so that they cover one or more nozzle caps and substantially prevent access to the fire hydrant.

BRIEF DESCRIPTION OF THE DRAWINGS

FIG. 1 shows a top view of a fire hydrant in accordance with the prior art;

FIG. 2 shows a top view of a fire hydrant protection device in accordance with a first embodiment of the present invention;

FIG. 3 shows a top view of the fire hydrant protection device of FIG. 2 connected to the fire hydrant of FIG. 1;

FIG. 6E shows a front view of the fire hydrant of FIG. 4 with the fire hydrant protection device of FIG. 6A locked thereon in the closed state;

FIG. 7A shows a front view of a fire hydrant protection device in accordance with a third embodiment of the present invention;

FIG. 7B shows a front view of the fire hydrant of FIG. 4 along with a cross sectional view of the fire hydrant protection device of FIG. 7A when it is placed on the fire hydrant of FIG. 4 and thereafter put in the closed state;

FIG. 7C shows a front view of the fire hydrant protection device of FIG. 7A with a first portion of the device locked to a second portion of the device so that the fire hydrant protection device is locked on to the fire hydrant of FIG. 4; and FIG. 7D shows a top view of a band or ring for locking the first portion of the fire hydrant protection device in FIG. 7A to the second portion of the fire protection device in FIG. 7A so that the fire hydrant protection device is locked on to the fire hydrant of FIG. 4.

DETAILED DESCRIPTION OF THE DRAWINGS

Figure 4:
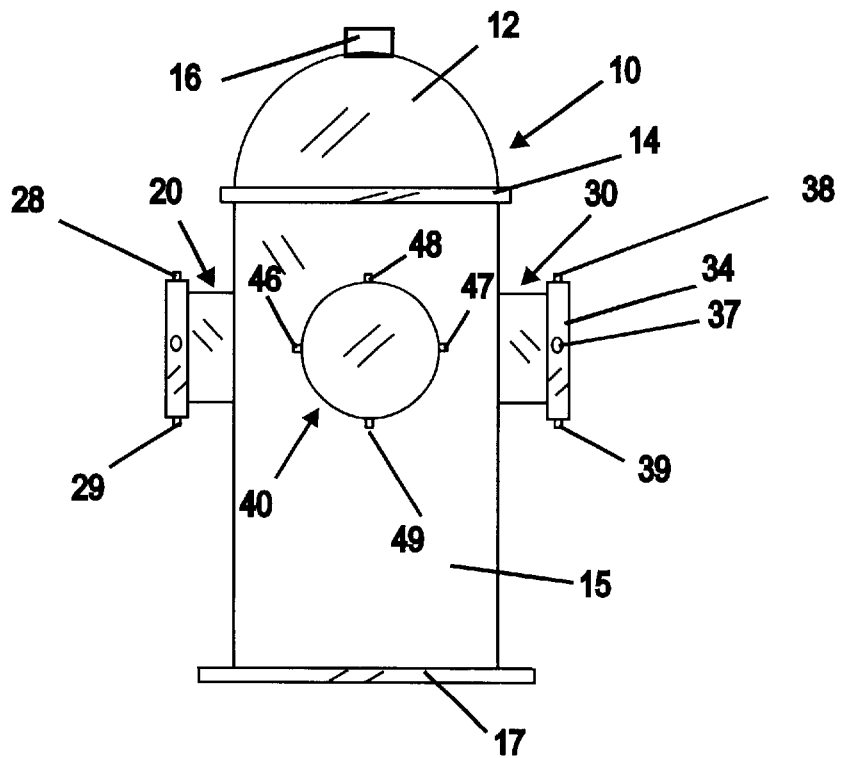
FIG. 4 shows a front view of the fire hydrant of FIG. 1 in accordance with the prior art.

FIG. 1 shows a top view of a fire hydrant 10. The fire hydrant 10 may be a typical fire hydrant known in the art. The fire hydrant 10 is comprised of a top portion 12, a bolt 16, a top peripheral portion 14, a body portion 15, and a bottom peripheral portion 17. The body portion 15 may be comprised of a solid metal cylinder. The fire hydrant 10 may also include nozzle devices 20, 30, and 40. Nozzle device 20 is comprised of a nozzle cap 24 which includes extensions 26, 27, and 28 (shown in FIG. 1) and extension 29 (shown in FIG. 4), and a nozzle tube 22. The nozzle cap 24 covers the nozzle tube 22 and prevents water from coming out of the fire hydrant 10 through the nozzle tube 22.

Similarly, nozzle devices 30 and 40 are comprised of nozzle cap 34 and nozzle cap 44, respectively, which include extensions 36, 37, 38, and 39 and extensions 46, 47, 48, and 49, (respectively). In addition, nozzles devices 30 and 40 include nozzle tubes 32 and 42, respectively. The nozzle caps 34 and 44 cover their respective nozzle tube 32 and 42 and prevent water from coming out of the fire hydrant 10 through the respective nozzle tube.

FIG. 2 shows a top view of a fire hydrant protection device 100 in accordance with a first embodiment of the present invention. The fire hydrant protection device 100 includes a first cover 102, a second cover 104, and a third cover 106 each of which is attached to a first portion 110 of an attachment device 105. Each of covers 102, 104, and 106 has an opening so that it can be placed over a fire hydrant nozzle cap, similar to opening 106b, into which can be inserted nozzle cap 44 of hydrant 10. Each of covers 102, 104, and 106 has a closed surface, similar to opening 106a which helps prevent its particular nozzle cap, such as cap 44, from being accessed. Each of the covers 102, 104 and 106 may otherwise be substantially in the form of a cylinder which may be made of metal.

The first portion 110 of the attachment device 105 is substantially in the shape of a ring having a gap 110a between a first end 110b and a second end 110c. The attachment device 105 also includes a second portion 108. The second portion 108 is rotatably connected to the first portion 110 of the attachment device 105 by a pin 108a near the first end 110b of the first portion 110. The second portion 108 may have a hole 108b which can be placed in alignment with a hole 108c of the first portion 108. A loop 120a of a lock 120, shown in FIG. 5 can be placed into the holes 108b and 108c and the lock 120 can be locked to fix the fire hydrant protection device 100 to the fire hydrant 10 as shown by referring to FIGS. 3 and 5. The first cover 102, second cover 104, and third cover 106 would be in the position shown in FIGS. 3 and 5 and the hole 108b and hole 108c would be aligned, with the first portion 110 and the second portion 108 forming a closed loop or closed ring.

The attachment device 105 when the first portion 110 is locked to the second portion 108 may be in the form of a solid metal ring. The first cover 102 second cover 104, and third cover 106 may be solid metal cylinders with a closed circular surface end, such as closed circular surface end 106a for the third cover 106 shown in FIG. 5. With the fire hydrant protective device 100 locked to the fire hydrant 10 as in FIG. 5, it is very difficult for an individual (without a key to the lock 120), to remove any of the covers 102, 104, or 106 or any of the nozzle caps 24, 34, or 44. In this manner the fire hydrant 10 in this embodiment has been made substantially tamper proof.

Figure 5:
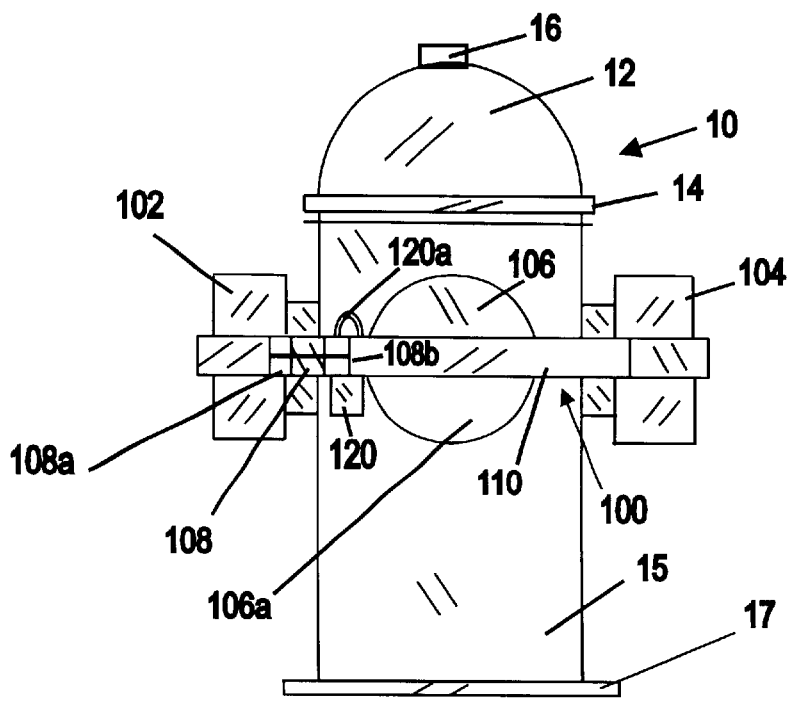
FIG. 5 shows a front view of the fire hydrant of FIGS. 1 and 4 connected to the fire hydrant protection device of FIG. 2.

FIG. 3 shows a top view of the fire hydrant protection device 100 of FIG. 2 connected to the fire hydrant 10 of FIG. 1. FIG. 4 shows a front view of the fire hydrant 10 of FIG. 1. FIG. 5 shows a front view of the fire hydrant 10 of FIGS. 1 and 4 connected to the fire hydrant protection device 100 of FIG. 2.

Figure 6A:
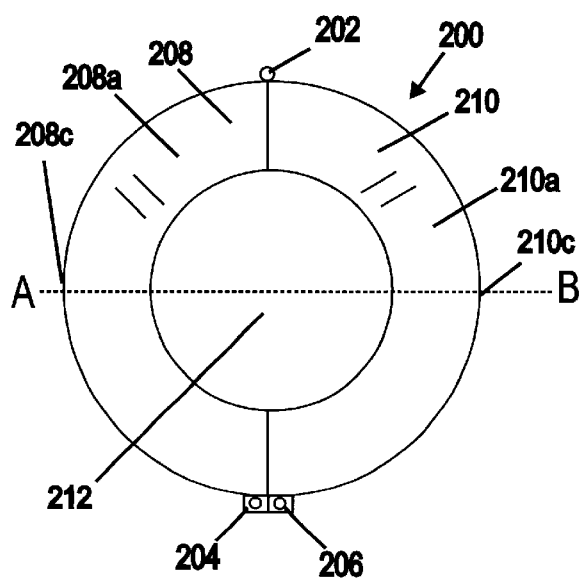
FIG. 6A shows a top view of a fire hydrant protection device in accordance with another embodiment of the present invention with this particular fire hydrant protection device in a closed state.
Figure 6B:
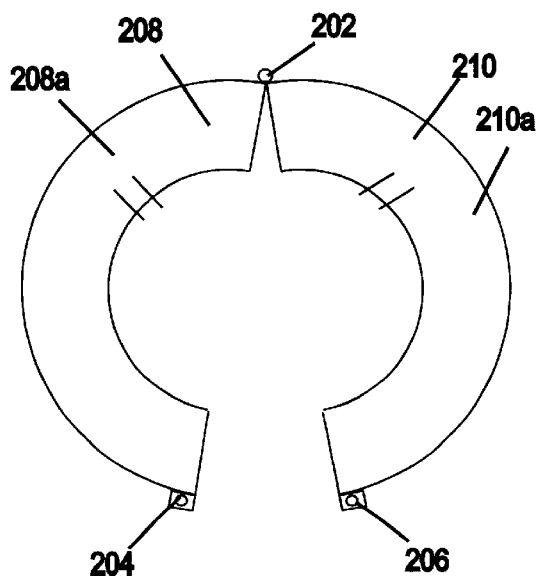
FIG. 6B shows a top view of the fire hydrant protection device of FIG. 6A with this particular fire hydrant protection device in an open state.
Figure 6C:
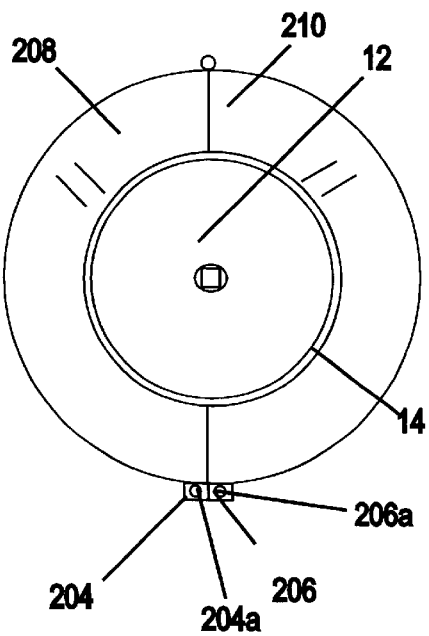
FIG. 6C shows a top view of the fire hydrant protection device of FIG. 6C in the closed state placed on the fire hydrant of FIG. 4.
Figure 6D:
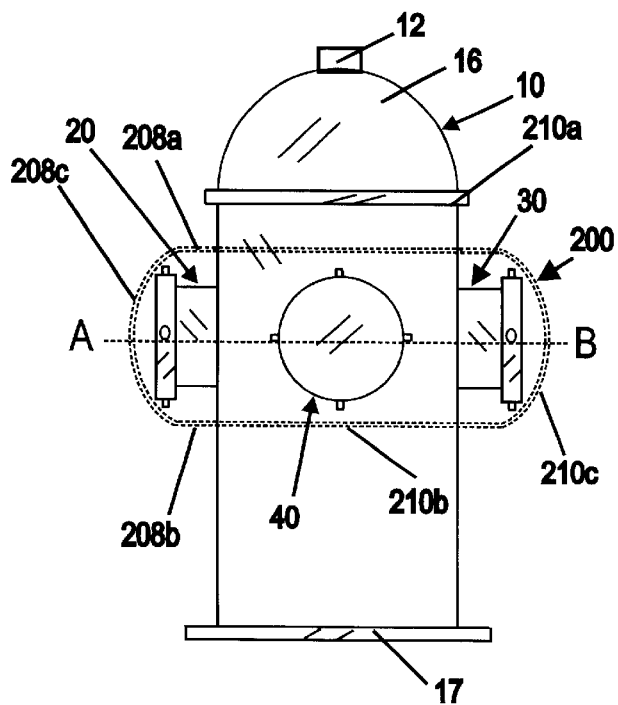
FIG. 6D shows a front view of the fire hydrant of FIG. 4 along with an outline of the location of the fire hydrant protection device of FIG. 6A when it is placed on the fire hydrant of FIG. 4 and thereafter put in the closed state.

FIG. 6A shows a top view of a fire hydrant protection device 200 in accordance with a second embodiment of the present invention in a closed state, FIG. 6B shows a top view of the fire hydrant protection device 200 in an open state. FIG. 6C shows a top view of the fire hydrant protection device 200 in the closed state placed on the fire hydrant 10 of FIG. 4. FIG. 6D shows a front view of the fire hydrant 10 of FIG. 4 along with an outline of the location of the fire hydrant protection device 200 of FIG. 6A when it is placed on the fire hydrant 10 of FIG. 4 and thereafter put in the closed state. FIG. 6E shows a front view of the fire hydrant 10 of FIG. 4 with the fire hydrant protection device 200 of FIG. 6A locked thereon in the closed state.

The fire hydrant protection device 200 includes a hinge 202, hasps 204 and 206, and portions 208 and 210. The portions 208 and 210 come together in the closed state of FIG. 6A to form a donut shape, having a central opening 212. Portions 208 and 210 have top surfaces 208a and 210a, bottom surfaces 208b and 210b, and curved side surfaces 208c and 210c, respectively. As shown in FIG. 6D, a channel 208d is within the borders of the top surface 208a, the bottom surface 208b, and the curved surface 208c and similarly a channel 210d is within the borders of the top surface 210a, the bottom surface 208b and the curved surface 210c. The nozzle devices 20, 30, and 40 of the fire hydrant 10 can be inserted into one or both of channels 208d or 210d. The top surfaces 208a and 210a, bottom surfaces 208b and 210b, and curved surfaces 208c and 210c prevent the nozzle devices 20, 30, and 40 from being accessed in the closed state as shown by FIGS. 6D and 6E. The portions 208 and 210 separately or together may be termed a cover. The hinge 202, hasps 204 and 206, and lock 220 may be termed part of an attachment device for attaching a cover comprised of one or both of portions 208 and 210 to the fire hydrant 10. One or both of the portions 208 and 210 may also be thought of as being part of an attachment device for attaching a cover comprised of one or both of portions 208 and 210 to the fire hydrant 10.

The outline shown in FIG. 6D of the hydrant protection device 200 is obtained by cutting the device 200 in half as shown in FIG. 6A along the line 6B and looking inside one half of the device 200. The hydrant protection device 200 may be placed in an open state as in FIG. 6B and then closed as shown by FIGS. 6C, 6D, and 6E around the fire hydrant 10 so that all three nozzle devices 20, 30 and 40 are protected with one or both of the channels 208d and 210d. After the hydrant protection device 200 has been closed as in FIG. 6C, a lock 220 may be inserted in holes 204a and 206a to connect the hasp 204 with the hasp 206 and to thereby lock the device 200 to the hydrant 10. The fire hydrant protection device 200 may also be thought of as including the lock 220 shown in FIG. 6E for locking the device 200 onto the fire hydrant 10.

FIG. 7A shows a front view of a fire hydrant protection device 300 in accordance with a third embodiment of the present invention.

The fire hydrant protection device 300 includes the first portion 310 and the second portion 320. The first portion 310 may be though of as a cover. The second portion 320 may be thought of as a base device for attaching to the base of the fire hydrant 10. The first portion 310 includes a flange or rim 314 and a body portion 312. The body portion 312 is comprised of a dome portion 312a and a cylindrical portion 312b. The second portion 320 includes a flange or rim 322 and is comprised of a cylindrical body portion 324. The first portion 310 has a closed end 310a and an open end 310b. The second portion 320 has open ends at both ends 320a and 320b. The second portion 320 includes a lip 324a which is used to connect the second portion 320 to the base 17 of the fire hydrant 10.

FIG. 7B shows a front view of the fire hydrant 10 of FIG. 4 along with a cross sectional view of the fire hydrant protection device 300 when it is placed on the fire hydrant 10 of FIG. 4 and thereafter put in a closed state. FIG. 7B also shows a cross sectional view of a ring or band 340 which can be thought of as being part of the fire hydrant protection device 300 or together with device 300 part of an overall fire hydrant protection device. The ring 340 has a U-shaped cross section as shown in FIG. 7B. Portion 314a of the rim 314 of the first portion 310 and portion 322a of the rim 322 of the second portion 320 are shown inserted into the U-shaped ring 340 at section 340a in FIG. 7B. Similarly portion 314b of the rim 314 of the first portion 310 and the portion 322a of the rim 322 of the second portion 320 are shown inserted into the U-shaped ring 340 at section 340b in FIG. 7B. In this manner the ring 340 can hold the first portion 310 and the second portion 320 of the protection device 300 together. The ring 340 may be thought of as an attachment device for attaching the portion 310 to the fire hydrant 10 by attaching the portion 310 to the based device, i.e. the portion 320

As also shown in FIG. 7B, the second portion 320 can be bolted to the base 17 of the fire hydrant 10, by bolts 337 and 339 inserted through lip 324a of the second portion 320 and partially or fully inserted into the base 17. The second portion 320 is thus held to the base 17 while the first portion 310 is held to the second portion 320.

FIG. 7C shows a front view of the fire hydrant protection device 300 with a first portion 310 of the device 300 locked to a second portion 320 of the device 300 so that the fire hydrant protection device 300 is locked on to the fire hydrant 10 of FIG. 4. FIG. 7D shows a top view of a band or ring 340 for locking the first portion 310 to the second portion 320 so that the fire hydrant protection device 300 is locked on to the fire hydrant 10 of FIG. 4. The ring 340 includes a clasp 360 which is rotatably connected to the ring 340 by pin 362. The ring 340 can be locked by lining the holes 364 and 342 up and then inserting the lock 350 and locking the lock 350. The ring 340 and lock 350 may be thought of as part of an overall hydrant protection device.

In operation, an individual may first place the second portion 320 over the top of hydrant 10 and then gradually move the second portion 320 to the bottom of the hydrant 10 so that the second portion 320 rests on the base 17. The individual may then bolt the second portion to the hydrant 10 with bolts 337 and 339. The individual may next place the first portion 310 over the top of the hydrant 10 and then line up the rim 314 on top of the rim 322 as shown by FIG. 7B. The individual may then place the ring 340 around the device 300 with the rims 314 and 322 inserted into the opening or channel of the U-shaped cross section of the ring 340. Finally the individual may secure the rim 314 to the rim 322 with the clasp 360 and the lock 350. The hydrant nozzles 20, 30 and 40 are now protected from tampering as shown in FIG. 7C.

The protection device 100 of FIG. 1 in one embodiment of the present invention prevents access to the hydrant 10 by covering the individual nozzle devices 20, 30, and 40. The covers 102, 104, and 106 may be metal covers and the first portion 110 of the attachment device 105 may be a metal band. Other materials such as plastics, glass, etc. may be used for the covers or attachment devices in any of the embodiments of the present invention. Also the the protection device, such as devices 100, 200, or 300 may be permanently installed, locked closed by means of welding, adhesives, a non-removable seal, etc., such that once installed, the device can only be removed by breaking it (this would enhance the product's tamper evident properties).

In the embodiment of FIGS. 7A–7D access is prevented by enclosing the entire hydrant 10 in portions 310 and 320, where portion 310 includes a dome shaped portion which is securely attached to the hydrant 10. The base portion 320 is attached to the base 17 of the hydrant 10 using the bolts 337 and 339, which attach the hydrant base 17 or flange to the city's piping system. These bolts 337 and 339 are on the interior of the portion 320, so they will be inaccessible once installed. Then the portion 310 which includes a dome can be lowered over the hydrant 10. The portion 310 may be made of metal, plastic, glass, or other types of materials. The upper and lower flanges or rims of portions 310 and 320 can be aligned and thereafter locked together via a locking band or ring 340 or other mechanism. This configuration may be also be locked closed by welding adhesives, a non removable seal, etc., such that once installed, the device 300, can only be removed by breaking it.

In addition to a conventional locking mechanism, the above devices, such as devices 100, 200, and 300 may utilize an electronic monitoring device. These devices would signal the authorities whenever a tampering event takes place. The tamper-evident features of all of these devices may be enhanced by incorporating electronic monitoring devices.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising
   a first cover which can cover a first nozzle cap of a fire hydrant;
   an attachment device to which the first cover is connected;
   wherein the attachment device can be used to attach the first cover to a fire hydrant such that the first cover covers the first nozzle cap; and
   wherein the first cover covers the first nozzle cap by surrounding the first nozzle cap except on a side of the first nozzle cap where the first nozzle cap attaches to a first nozzle tube of the fire hydrant.

2. The apparatus of claim 1 wherein
   the attachment device is comprised of a first portion, the first portion substantially in the form of a ring.

3. The apparatus of claim 2 wherein
   the attachment device is comprised of a second portion, and the second portion can be connected to the first portion so that the first portion and the second portion provide a closed ring.

4. The apparatus of claim 1 further comprising
   a second cover, which can cover a second nozzle cap of the fire hydrant, wherein the second cover is connected to the attachment device;
   wherein the attachment device can be used to attach the second cover to the fire hydrant such that the second cover covers the second nozzle cap while at the same time the first cover is attached to the first hydrant and covers the first nozzle cap; and
   wherein the second cover covers the second nozzle cap by surrounding the second nozzle cap except on a side of the second nozzle cap where the second nozzle cap attaches to a second nozzle tube of the fire hydrant.

5. The apparatus of claim 4 further comprising a third cover, which can cover a third nozzle cap of the fire hydrant, wherein the third cover is connected to the attachment device;

wherein the attachment device can be used to attach the third cover to the fire hydrant such that the third cover covers the third nozzle cap while at the same time the first cover is attached to the first hydrant and covers the first nozzle cap, and the second cover is attached to the fire hydrant and covers the second nozzle cap; and wherein the third cover covers the third nozzle cap by surrounding the third nozzle cap except on a side of the third nozzle cap where the third nozzle cap attaches to a third nozzle tube of the fire hydrant.

6. The apparatus of claim 5 wherein the first cover has an opening into which the first nozzle cap can be inserted and a closed surface which substantially prevents the first nozzle cap from being removed;

the second cover has an opening into which the second nozzle cap can be inserted and a closed surface which substantially prevents the second nozzle cap from being removed; and the third cover has an opening into which the third nozzle cap can be inserted and a closed surface which substantially prevents the third nozzle cap from being removed.

7. The apparatus of claim 6 wherein the first cover includes a substantially cylindrical body portion;

and the opening of the first cover lies at one end of the substantially cylindrical body portion of the first cover and the closed surface of the first cover lies at an opposite end of the substantially cylindrical body portion of the first cover;

the second cover includes a substantially cylindrical body portion;

and the opening of the second cover lies at one end of the substantially cylindrical body portion of the second cover and the closed surface of the second cover lies at an opposite end of the substantially cylindrical body portion of the second cover.

the third cover includes a substantially cylindrical body portion;

and the opening of the third cover lies at one end of the substantially cylindrical body portion of the third cover and the closed surface of the third cover lies at an opposite end of the substantially cylindrical body portion of the third cover.

8. The apparatus of claim 4 wherein the first cover has an opening into which the first nozzle cap can be inserted and a closed surface which substantially prevents the first nozzle cap from being removed; and the second cover has an opening into which the second nozzle cap can be inserted and a closed surface which substantially prevents the second nozzle cap from being removed.

9. The apparatus of claim 8 wherein the first cover includes a substantially cylindrical body portion;

and the opening of the first cover lies at one end of the substantially cylindrical body portion of the first cover and the closed surface of the first cover lies at an opposite end of the substantially cylindrical body portion of the first cover;

the second cover includes a substantially cylindrical body portion;

and the opening of the second cover lies at one end of the substantially cylindrical body portion of the second cover and the closed surface of the second cover lies at an opposite end of the substantially cylindrical body portion of the second cover.

10. The apparatus of claim 4 wherein the first and second covers together form a donut shaped cover having a top surface, a side surface and a bottom surface which define a channel;

and wherein when the first cover covers the first nozzle cap, the first nozzle cap resides in the channel and when the second cover covers the second nozzle cap, the second nozzle cap resides in the channel.

11. The apparatus of claim 1 wherein the first cover has an opening into which the first nozzle cap can be inserted and a closed surface which substantially prevents the first nozzle cap from being removed.

12. The apparatus of claim 11 wherein the first cover includes a substantially cylindrical body portion;

and the opening lies at one end of the substantially cylindrical body portion and the closed surface lies at an opposite end of the substantially cylindrical body portion.

13. A method comprising the steps of:

attaching a first cover to a fire hydrant such that the first cover covers a first nozzle cap of the fire hydrant; and wherein the first cover covers the first nozzle cap of the fire hydrant by surrounding the first nozzle cap except on a side of the first nozzle cap where the first nozzle cap attaches to a first nozzle tube of the fire hydrant.

14. The method of claim 13 further comprising wherein the first cover is attached to the fire hydrant by attaching an attachment device to which the first cover is connected, to the fire hydrant.

15. The method of claim 14 wherein the attachment device is comprised of a first portion, the first portion substantially in the form of a ring.

16. The method of claim 13 further comprising attaching a second cover to the fire hydrant such that the second cover covers a second nozzle cap of the fire hydrant; and wherein the second cover covers the second nozzle cap of the fire hydrant by surrounding the second nozzle cap except on a side of the second nozzle cap where the second nozzle cap attaches to a second nozzle tube of the fire hydrant.

17. The method of claim 16 further wherein the first cover and the second cover are connected to an attachment device;

and wherein the first and the second cover are attached to the fire hydrant by attaching the attachment device to the fire hydrant.

18. The method of claim 16 further comprising attaching a third cover to the fire hydrant such that the third cover covers a third nozzle cap of the fire hydrant; and wherein the third cover covers the third nozzle cap of the fire hydrant by surrounding the third nozzle cap except on a side of the third nozzle cap where the third nozzle cap attaches to a third nozzle tube of the fire hydrant.

19. The method of claim 18 further comprising the first cover, the second cover, and the third cover are connected to an attachment device;

and wherein the first cover, the second cover, and the third cover are attached to the fire hydrant by attaching the attachment device to the fire hydrant.

20. The apparatus of claim 2 wherein the first cover is donut shaped; and wherein the first cover is comprised of a top surface, a side surface, and a bottom surface which define a channel; and wherein when the first cover covers the first nozzle cap, the first nozzle cap resides in the first channel.

21. The apparatus of claim 1 wherein the first cover is includes a dome shaped portion.

22. The apparatus of claim 21 further comprising a base device which can be attached to the base of the fire hydrant;

wherein the attachment device can attach the first cover to the base device, and thereby attach the first cover to the fire hydrant.

* * * * *